United States Patent [19]

Lachance et al.

[11] Patent Number: 4,720,235

[45] Date of Patent: Jan. 19, 1988

[54] TURBINE ENGINE WITH INDUCED PRE-SWIRL AT THE COMPRESSOR INLET

[75] Inventors: Roger Lachance, Longueuil; Vasil Ozarapoglu, St. Lambert, both of Canada

[73] Assignee: Pratt & Whitney Canada Inc., Longueuil, Canada

[21] Appl. No.: 870,085

[22] Filed: Jun. 3, 1986

Related U.S. Application Data

[63] Continuation-in-part of Ser. No. 726,688, Apr. 24, 1985, abandoned.

[30] Foreign Application Priority Data

Apr. 23, 1986 [EP] European Pat. Off. ............ 86105589

[51] Int. Cl.⁴ ................................................ F01D 1/12
[52] U.S. Cl. ............................ 415/53 R; 415/DIG. 1; 416/97 R
[58] Field of Search ................. 415/53 R, 52, DIG. 1, 415/11; 416/97 R

[56] References Cited

U.S. PATENT DOCUMENTS

| | | | |
|---|---|---|---|
| 1,970,435 | 8/1934 | Shapp | 416/228 |
| 2,808,197 | 10/1957 | Forgo | 415/53 |
| 2,944,729 | 7/1960 | Foley et al. | 415/144 |
| 3,433,015 | 3/1969 | Sneeden | 415/115 |
| 4,066,552 | 1/1978 | Caine | 415/143 |
| 4,222,703 | 9/1980 | Schaum et al. | 415/53 R |
| 4,357,914 | 11/1982 | Hauser | 415/53 R |
| 4,403,917 | 9/1983 | Laffitte et al. | 416/97 R |
| 4,456,428 | 6/1984 | Cuvillier | 416/97 R |
| 4,462,754 | 7/1984 | Schofield | 416/97 R |

Primary Examiner—Robert E. Garrett
Assistant Examiner—John T. Kwon
Attorney, Agent, or Firm—Schwartz, Jeffery, Schwaab, Mack, Blumenthal & Evans

[57] ABSTRACT

A jet flap construction for the compressor of an aircraft gas turbine engine provided with a bleed for bleeding air interstage of the compressor and communicating with the hollowed-out struts in the airflow path to the compressor. The hollow struts are each provided with one or more rows of discrete openings extending from the shroud to the hub on the strut to form an aligned series of jets for discharging the pressurized bleed air and forming a jet flap, thereby providing pre-swirl at the compressor inlet.

11 Claims, 7 Drawing Figures

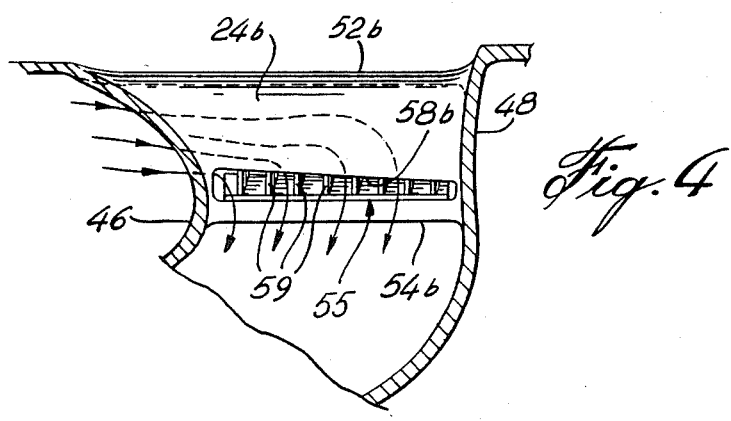
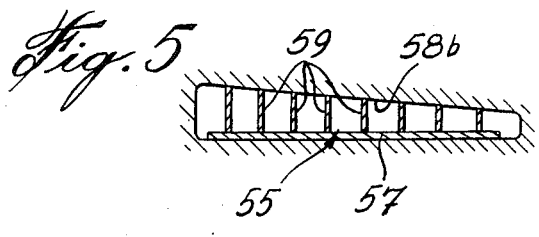

TURBINE ENGINE WITH INDUCED PRE-SWIRL AT THE COMPRESSOR INLET

CROSS-REFERENCE TO RELATED APPLICATION

This application is a continuation-in-part of U.S. application Ser. No. 726,688, filed Apr. 24, 1985, now abandoned.

BACKGROUND OF THE INVENTION

1. Field of the Invention

The present invention relates to a turbine engine, and particularly to a jet flap arrangement for producing a pre-swirl at the compressor inlet.

2. Description of the Prior Art

Attempts have been made in the past to overcome the problem of engine surge at off design modes in gas turbine engines while producing pre-swirl in the compressor inlet by bleeding air interstage of the compressor and advantageously using this bleed air to form a jet flap on a hollow strut in the compressor inlet such as described in U.S. Pat. No. 4,222,703, Schaum et al, 1980.

The Schaum et al patent describes a hollow strut in the compressor inlet preceding the first compressor stage communicating with a passage and a bleed valve for bleeding air from interstage of the compressor. The hollow strut has a slot near the trailing edge of the strut for producing the jet flap. The strut extends between the shroud and the hub in that portion of the engine thereof. It has been found that the inertia of the bleed air moving in the strut from the shroud to the hub will cause the air distribution at the slot forming the jet flap to be unequal and for the highest pressure to be nearest the hub, thereby affecting the pre-swirl at the compressor inlet.

SUMMARY OF THE INVENTION

It is an aim of the present invention to provide an improved jet flap arrangement in order to create a more efficient compressor pre-swirl to enhance engine stability and performance particularly at low speed off-design conditions.

A construction in accordance with the present invention comprises an apparatus for providing an induced pre-swirl at the entry to the compressor of a gas turbine engine. An airflow path is defined between the shroud and the hub of the engine for passing air to the compressor entry. A plurality of airfoils extend across the airflow path between the shroud and hub of the engine and upstream of the compressor entry. The airfoils are hollow and communicate with an air inlet in the shroud for communicating with a source of a pressurized gas flow. The airfoil has a leading edge and a trailing edge relative to the airflow path and a plurality of discrete openings in a wall of the hollow airfoil, wherein the plurality of openings are closely spaced apart and define an axis extending across the airflow path from the shroud to the hub and spaced a short distance from the trailing edge of the airfoil. The plurality of discrete openings form nozzles for the discharge of the pressurized gas flow, thereby forming a jet flap across the airflow path for creating a preswirl in the airflow path.

The selective location, size and angle of the discrete openings will determine the distribution of pre-swirl in the airflow path in front of the compressor. In other words, although the provision of a plurality of openings in one or more rows in the airfoil across the airflow path may have the effect of equalizing the air distribution across the airflow path to form a more effective jet flap than that described in the Schaum et al patent, the actual determination of the size of the different discrete openings will affect the actual jet flap angle and thus the pre-swirl of the airflow at different radial distances across the airflow path in front of the compressor. For instance, the angle of pre-swirl required near the tip of the first stage compressor rotor may be different from the angle of pre-swirl of the airflow near the hub of the rotor as a result of the twist of the rotor blades on the rotor, keeping in mind that it is a purpose of pre-swirl to reduce the angle of incidence of the airflow to the rotor blades and thereby improve performance and compressor stability.

Thus, in any predetermined engine design, a bleed air jet flap can be designed by providing on the hollow struts within the compressor inlet a pattern of discrete holes which have been determined by the angle of pre-swirl required at the face of the compressor in different sectors across the airflow path determined by the compressor inlet. In other words, given an engine compressor section having a circumferential inlet determined by an airflow path leading to an axial compressor having a first stage rotor wherein the airflow path is defined by a hub side wall and a shroud side wall and wherein radially extending hollow struts are spaced apart in the inlet between the hub and shroud walls, the gradient of the pre-swirl angle relative to the rotor can be varied radially from the hub of the rotor to the tips of the rotor.

It is necessary, therefore, to determine the required angle of pre-swirl in the airflow relative to the rotor at different radial sectors of the airflow path in front of the compressor and to translate these different angular profiles to the pre-swirl ultimately to the pattern of discrete openings provided in the hollow struts which form the jet flap. In other words, sectors across the height of the strut corresponding to the radial sectors at the face of the compressor can be provided with discrete openings which can be designed in terms of their size, location, and angle to provide the required pre-swirl angle in the different radial sectors at the face of the compressor within certain parameters.

More specifically, the airfoils may be struts extending between the shroud and hub in the airflow path. One or more rows of openings may be provided in the wall of the airfoil extending across the airstream path from the shroud to the hub. The openings may be larger near the shroud and be of gradually smaller size towards the hub.

One of the advantages of such a construction, that is, of having a row or a plurality of rows of openings across the airflow path from the shroud to the hub, is to provide a better distribution of air forming the jet flap, thereby improving the pre-swirl distribution at the entry of the compressor.

One of the important advantages is that the angle of incidence of the airflow at the leading edge of the rotor blades is reduced in different radial sectors of the blades.

In another embodiment, the closely spaced-apart openings may be in the form of an elongated tapered slot with the larger width of the slot near the shroud extending towards the hub and a series of partitions extending across the slot defining the discrete openings. The partitions could be in the form of an insert having a common base member with spaced-apart partition walls extending at 90° from the base member, the insert being adapted to be fitted into the slot.

BRIEF DESCRIPTION OF THE DRAWINGS

Having thus generally described the nature of the invention, reference will now be made to the accompanying drawings, showing by way of illustration, a preferred embodiment thereof, and in which:

FIG. 4 is an enlarged fragmentary longitudinal cross-section similar to FIG. 2 but showing yet another embodiment thereof;

FIG. 5 is a fragmentary enlarged view of a detail shown in FIG. 4;

DESCRIPTION OF THE PREFERRED EMBODIMENTS

Figure 1:
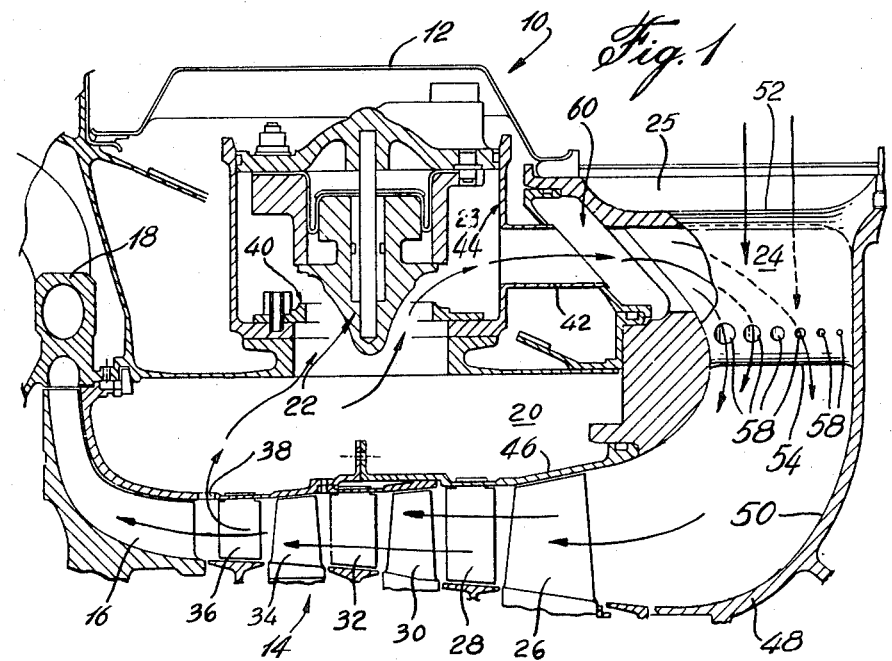
FIG. 1 is a fragmentary axial cross-section of a detail of a typical turbine engine compressor.

Referring now to the drawings and particularl to FIG. 1, there is shown a fragment of a typical turbine engine 10 illustrating the compressor section.

The engine 10 includes an outer casing 12 surrounding a multi-stage, single shaft compressor 14. As part of the compressor, a centrifugal impeller 16 is mounted on the same shaft (not shown). A diffuser 18 is concentric with the outlet of the impeller 16. An annular chamber 20, which might be referred to as a plenum chamber, surrounds the compressor 14. One or more bleed valves 22 will control the flow of air on the plenum chamber 20 to the hollow struts 24. A plurality of radially and axially extending engine support struts 24 are normally provided in the inlet case 25. The struts 24 in the present invention are hollow as will be described later. The main airflow path 50 is defined between the shroud 46 and the hub 48.

The compressor 14 in this particular embodiment includes a leading rotor section 26 having a plurality of blades mounted to the shaft (not shown) with subsequent rotor stages represented by rotor blades 30 and 34. Interstage of the rotor blades 26, 30 and 34 are the stator vane stages 28 and 32. Finally, between the rotor 34 and impeller 16 is a stage of stator vanes 36.

A plurality of bleed ports 38 is provided in the present embodiment between the stator vane stage 36 and the impeller 16 to bleed air from the compressor into the plenum 20, particularly at low power modes. The bleed ports 38 could be provided between other stages of the compressor, but preferably not at the exit of the compressor that is beyond the diffused 18 since considerable work has been done to the air by this stage. It has been noted that the bleed port 38 can also be provided at the impeller shroud.

A valve seat 40 is provided with each valve 22. The valve 22 and valve seat 40 are substantially as described in U.S. Pat. Nos. 3,360,189 and 4,222,703. In the former patent, the valve controls bleed air from the compressor to allow the bleed air to discharge overboard the engine. In the latter patent, the valve chamber communicates with a plurality of conduits which pass the pressurized bleed air to each individual hollowed-out support strut via a communicating volute to equalize flow distribution. Similarly, in the present embodiment as shown in FIG. 1, the conduits 42 pass the pressurized bleed air from the valve chamber 44 and plenum 20 through the communicating volute 60 into the hollowed-out support struts 24.

Figure 2:
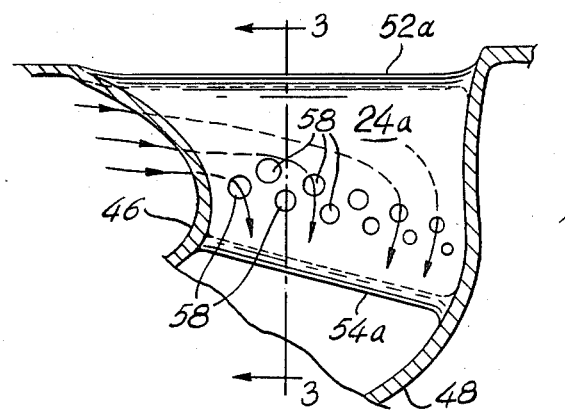
FIG. 2 is an enlarged fragmentary longitudinal cross-section of a detail shown in FIG. 1 but modified to show a different embodiment thereof.
Figure 3:
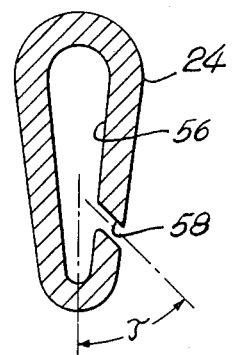
FIG. 3 is a vertical cross-section taken along line 3—3 of FIG. 2.

The support strut 24, as shown in FIG. 3, has a cavity 56, communicating with the volute 60. In the embodiment shown in FIGS. 1, 2 and 3, different size bores or openings 58 are drilled in the side wall of the strut 24. In the embodiment shown in FIG. 1, the openings 58 have gradually decreasing diameters from the shroud 46 to the hub 48. On the other hand, it is understood that these openings may vary in size depending on the requirements of the pre-swirl as will be described.

In the present embodiment, each of the openings 58 is aligned in a row having an axis substantially parallel to the trailing edge 54 of the strut 24. In the present embodiment, a line tangent to the bottom of the circular openings 58 is parallel to the trailing edge 54.

In FIG. 1, only one row of openings 58 is provided, while in FIG. 2, two rows of openings 58 are illustrated with the openings staggered as shown. The openings 58 are drilled at an angle $\tau$ to the apparent median plane of the strut 24. In tests, the angles were selected at between 30° and 60° from the plane.

In operation, when the engine is idling or at low speed, the valve 22 is operated so as to retract from the valve seat 40 and allow air to bleed from the ports 38 to the plenum 20 through the valve chamber 44, the conduits 42, the volute 60 and into the hollow cavities 56 of the struts 24 to then be discharged under pressure through the openings 58 forming a jet flap in order to provide pre-swirl to the air entering the engine in the inlet 25. The concept of providing pre-swirl in the airflow by means of a jet flap is well described in U.S. Pat. No. 4,222,703. The present arrangement of the discrete openings 58 allows for better distribution of the pressurized jet flap across the main airflow passage. Since the momentum of the air entering the cavity 56 from the shroud side of the strut 24 is to move towards the hub, the openings 58 nearest the hub may be smaller than the openings near the shroud in order to enhance the jet flap uniformity across the airflow path.

EXAMPLE 1

| | |
|---|---|
| The width of air path from the shroud to the hub at the level of the jet flap | 3 in. |
| Number of rows | 1 |
| Number of openings | 8 |
| Diameter of opening nearest shroud | 0.386 in. |
| Diameter of opening nearest hub | 0.136 in. |
| Total area of openings | 0.46 in.$^2$ |
| Spacing between openings in straight line | .12 in. |

The line tangent to the bottom of the openings is parallel to the strut trailing edge and is located about 0.25 in. upstream from the trailing edge of the strut.

| | |
|---|---|
| Angle of bore of openings from median plane of strut | 45° |
| The width of air path from the shroud to the hub at the level of the jet flap | 1.8 in. |
| Number of rows | 2 |
| Number of openings | 9 |
| Diameter of opening nearest shroud | .400 in. |
| Diameter of opening nearest hub | 0.160 in. |
| Total area of openings | 0.493 in.$^2$ |
| Angle of bore of openings from median plane of strut | 45° |

In the case of two or more rows of openings, advantages were found over a single row. For instance, more pressure bleed air is used to form the jet flap and thus almost all bleed air can be used rather than dumping the bleed air overboard. Bleed air already has energy, having been bled downstream of the compressor. Multiple rows with the openings staggered provide better distribution of the jet flap air.

The downward angle $\tau$ of the bore of the openings is important to the pre-swirl design. This angle may be varied. So far, tests have shown that the angle can be anywhere between 30° and 60°.

The embodiment shown in FIG. 4 shows a strut 24b with a leading edge 52b and a trailing edge 54b. The shroud 46 and hub 48 are also represented. In this embodiment, as shown in FIGS. 4 and 5, a conventional jet flap slot 58b is provided in the strut 24b. The discrete openings are defined by the provision of an insert 55 having a base 57 and several upstanding partition walls 59. The partition walls 59 extend across the entire width of the slot 58b in order to form the discrete openings and thus direct the flow of pressurized gas forming the jet flap.

In addition to obtaining a better distribution of bleed air forming the jet flap across the airflow path 50 as defined by the shroud 46 and the hub 48, a varied angular profile of the pre-swirl at the compressor rotor stage 26 can be provided as will now be described. As is well known, the blades of the first stage rotor 26 will have varying degrees of blade leading edge metal angle from the root of the blade at the hub to the tip of the blade. The angle of incidence, therefore, changes along the profile of the leading edge of the rotor radially from the hub to the tip (the tip being closest to the shroud).

In order to predict and properly provide for the variable angular profile of the pre-swirl at the face of the compressor, a pattern of angles $\alpha$ at the compressor face in different radial sectors of the airflow path is first determined at a given rpm. Then, a model of the airflow path is made at the level of the strut 24, that is, near the trailing edge 54 thereof, in order to determine the $m_o$ (the mass airflow rate lb/s) in the different radial sectors determined by the streamlined pattern in those sectors. Likewise, $V_o$ (velocity of the airflow ft/s) is also determined. $m_o V_o$ is the airflow momentum in the airflow path upstream of the openings 58.

Figure 7:
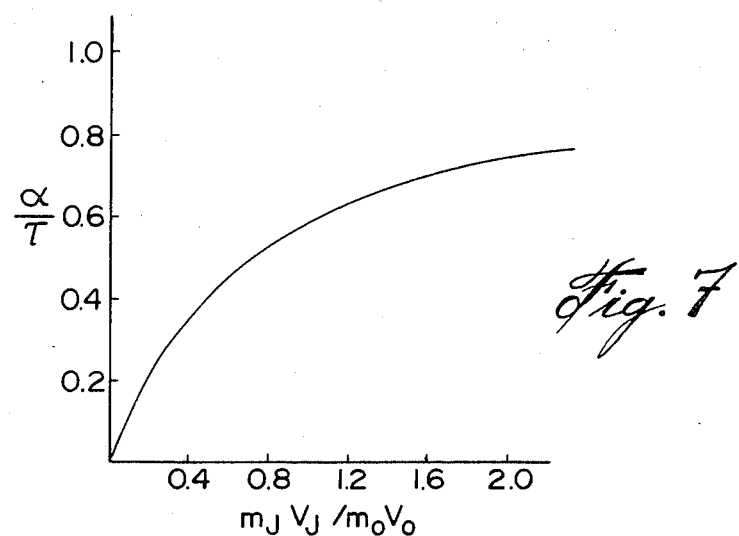
FIG. 7 is a graph showing the ratio of the pre-swirl angle of the airflow at the compressor face compared against the ratio nozzle jet momentum to the airflow momentum ratio at the strut.

Referring now to FIG. 7, it can be seen that, given the angle $\alpha$ required in a particular radial sector and knowing $m_o V_o$ in that sector, $m_j$ (mass flow rate of the jet from the opening 58) and $V_j$ (velocity of the jet at the nozzle 58) can be determined, keeping in mind the angle $\tau$ which can vary from 30° to 60°. It has been found that the angle $\tau$ is preferably at 45°. Thus, having decided the jet momentum $m_j V_j$ in each sector, it is a simple matter to determine the size or area of the opening 58 and the distribution of the opening 58 in a particular sector, that is, whether, given structural and aerodynamic factors, several rows of openings are required in the strut or whether larger or smaller openings are required. Since the openings 58 are like nozzles, they can be designed to direct the air jets therefrom.

Figure 6:
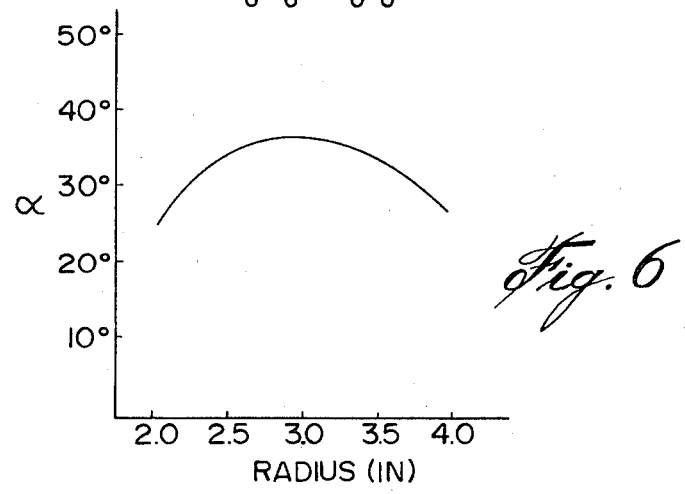
FIG. 6 is a graph showing the pre-swirl angle profile of the airflow at the compressor face in degrees against the radial distance from the hub of the rotor.

FIG. 6 shows a particular selection of an angular profile of the pre-swirl at the compressor face or at the first stage rotor between the hub and the shroud as a result of providing two rows of holes and having designed the size of the holes to meet the angular profile required at the compressor face following the above methods.

The ratio $m_j V_j/m_o V_o$, as shown in FIG. 7, is, in fact, the momentum ratio of the jet over the air stream. As can be seen from FIG. 7, it is this ratio which will affect the angular profile of the pre-swirl at the compressor face. It is noted that the curve in FIG. 7 was developed experimentally from a large number of tests, and the curve is not a straightforward relation which can be found in any textbook.

We claim:

1. An apparatus for providing an induced pre-swirl at the entry of a compressor of a gas turbine engine, the engine including a shroud and hub walls defining an airflow path to the compressor entry, a plurality of hollow members extending across the airflow path between the shroud and hub of the engine and upstream of the compressor entry, the members communicating with an air inlet in the shroud for communicating with a source of a pressurized gas flow, each member having a leading edge and a trailing edge relative to the airflow path and at least a row formed of a plurality of discrete openings each defining an individual nozzle to form a jet and said plurality of discrete openeings defining an axis extending from the shroud to the hub, and the area of the discrete openings gradually decreases from the shroud and the hub, with the row of openings being spaced a short distance from the trailing edge of the member, each opening having a location, size and angle which is a factor in the formation of the individual jets forming a jet flap and thus the angle of pre-swirl flow in a corresponding radial sector at the compressor, said location and size of each discrete opening being determined by the required $m_j V_j/m_o V_o$ in a sector of the airflow path at the member to provide a predetermined pre-swirl angle $\alpha$ in a corresponding radial sector of the airflow path at the compressor inlet where $m_j$ is the mass flow rate of the jet of bleed air from said opening, $V_j$ is the velocity of the jet, $m_o$ is the mass airflow rate upstream of the member in said section, $V_o$ is the velocity of said airflow, and $\alpha$ is the pre-swirl angle at the compressor inlet in said radial sector.

2. An apparatus as defined in claim 1, wherein the discrete openings are in the form of bores in the member wall extending at an acute angle from the median plane of the member in a direction downstream of the member.

3. An apparatus as defined in claim 2, wherein the acute angle of the opening bores is between 30° and 60° to the median plane of the member.

4. An apparatus as defined in claim 2, wherein the openings are circular bores, and each bore has a diameter gradually decreasing from the bore closest to the shroud to the bore closest to the hub.

5. An apparatus as defined in claim 1, wherein there are at least two rows of discrete openings in the wall of the member, the openings in one row being staggered with the openings in the other row so as to provide a uniform distribution of pressurized gas to form the jet flap.

6. An apparatus as defined in claim 1, wherein the discrete openings are in the form of an elongated slot defined in the wall of the member with partitions extending across the width of the slot to define separate and distinct discrete openings successively along the slot.

7. An apparatus as defined in claim 1, wherein the member is in the form of a support strut extending between the hub and the shroud of the engine.

8. An apparatus as defined in claim 1, wherein the compressor is provided with a plurality of stator and alternating rotor stages on a single shaft, and bleed ports are provided in the shroud interstage of the compressor communicating with a plenum chamber in which the bleed air from the bleed ports is collected, and a valve device is provided for selectively passing bleed air through the inlets in the shroud to the hollow members for forming the jet flap.

9. An apparatus as defined in claim 3, wherein the angle of the bores is 45° to the median plane of the member.

10. A method of providing a pre-swirl in the air intake of a gas turbine engine at the compressor face in different radial sectors thereof, wherein the air intake includes an airflow path and members extending across the airflow path, the method comprising the steps of determining the required angle $\alpha$ of pre-swirl in a predetermined radial sector at the compressor face, determining the airflow momentum $m_o V_o$ upstream of the member in a corresponding sector, where $m_o$ is the mass airflow rate for the sector and $V_o$ is the velocity of the airflow in said sector, from the angle $\alpha$, and $m_o V_o$; determining the $m_j V_j$ of bleed air jets at the member in the sector required to provide a predetermined jet flap momentum $m_j V_j/m_o V_o$, where the jet flap momentum is a function of the angle $\alpha$, where $m_j$ is the mass flow rate of the jet, and $V_j$ is the velocity of the jet; determining the size and location and angle of a plurality of discrete openings defining individual nozzles to form individual jets in the sector to provide said jet flap momentum and the area of the discreate openings gradually decreases from the shroud to the hub.

11. A method as defined in claim 10 wherein the angle of the discrete openings is between 30° and 60° from the median plane of the members.

* * * * *